United States Patent
Fernandez-Mattos et al.

(10) Patent No.: US 12,212,222 B2
(45) Date of Patent: Jan. 28, 2025

(54) SWITCHING BRIDGE FOR WIDE GAIN CONVERTER

(71) Applicant: Hamilton Sundstrand Corporation, Charlotte, NC (US)

(72) Inventors: Rodrigo Fernandez-Mattos, Solihull (GB); Andrew Mclean, Halesowen (GB); Jiewen Hu, Blacksburg, VA (US); Rolando Burgos, Blacksburg, VA (US); Bo Wen, Blacksburg, VA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/946,668

(22) Filed: Sep. 16, 2022

(65) Prior Publication Data

US 2023/0103777 A1    Apr. 6, 2023

(30) Foreign Application Priority Data

Oct. 5, 2021   (EP) .................................... 21275145

(51) Int. Cl.
*H02M 7/48* (2007.01)
*H02M 1/00* (2006.01)
*H02M 3/00* (2006.01)
*H02M 7/483* (2007.01)

(52) U.S. Cl.
CPC ............ *H02M 1/0095* (2021.05); *H02M 3/01* (2021.05); *H02M 7/4826* (2013.01); *H02M 7/4837* (2021.05); *H02M 7/4815* (2021.05)

(58) Field of Classification Search
CPC ............ H02M 1/0095; H02M 3/3353; H02M 7/4811; H02M 7/4815; H02M 7/4826; H02M 7/4837
See application file for complete search history.

(56) References Cited

U.S. PATENT DOCUMENTS

| | | | |
|---|---|---|---|
| 8,559,194 B2 | 10/2013 | Coccia et al. | |
| 9,768,700 B2 | 9/2017 | Oh et al. | |
| 10,944,329 B2 | 3/2021 | Wang et al. | |
| 2007/0296383 A1* | 12/2007 | Xu | H02M 7/4837 323/282 |
| 2009/0316443 A1* | 12/2009 | Coccia | H02M 1/10 363/21.06 |

(Continued)

FOREIGN PATENT DOCUMENTS

| | | | |
|---|---|---|---|
| CN | 101471606 A | 7/2009 | |
| WO | WO-2015029640 A1 * | 3/2015 | ........ H02M 3/3376 |

OTHER PUBLICATIONS

Extended European Search Report for European Patent Application No. EP21275145.7, dated Mar. 14, 2022.

(Continued)

*Primary Examiner* — Gary A Nash

(57) ABSTRACT

A switching bridge for the DC-DC stage of a power converter, the switching bridge having one or more sets of upper and lower series-connected switches (S1, S2) connected across a DC bus and arranged to be switched to provide an output AC voltage, the switching bridge further comprising a voltage divider (C1) arranged to vary the output AC voltage level according to the switching state of the switches.

20 Claims, 3 Drawing Sheets

Converter gain = switching bridge gain * resonant tank gain * transformer turn ratio

(56) References Cited

U.S. PATENT DOCUMENTS

| | | | |
|---|---|---|---|
| 2011/0222317 A1* | 9/2011 | Coccia | H02M 7/4837 363/21.02 |
| 2015/0049515 A1 | 2/2015 | Zhao et al. | |
| 2017/0093165 A1* | 3/2017 | Liao | H02J 5/00 |
| 2017/0214309 A1* | 7/2017 | Yoscovich | H02M 7/4833 |
| 2017/0237339 A1* | 8/2017 | Young | H02M 1/38 363/126 |
| 2019/0089254 A1* | 3/2019 | Op Het Veld | H02M 3/01 |
| 2020/0266719 A1* | 8/2020 | Oh | H02M 7/5387 |
| 2020/0321878 A1 | 10/2020 | Zhang et al. | |
| 2020/0366215 A1 | 11/2020 | Chen et al. | |

OTHER PUBLICATIONS

Jiang Tianyang et al: "A Bidirectional Three-Level LLC Resonant Converter With PWAM Control", IEEE Transactions on Power Electronics, Institute of Electrical and Electronics Engineers, USA, vol. 31, No. 3, Mar. 1, 2016 (Mar. 1, 2016), pp. 2213-2225, XP011590485, ISSN: 0885-8993, DOI: 10.1109/TPEL.2015. 2438072; retrieved on Nov. 16, 2015.

\* cited by examiner

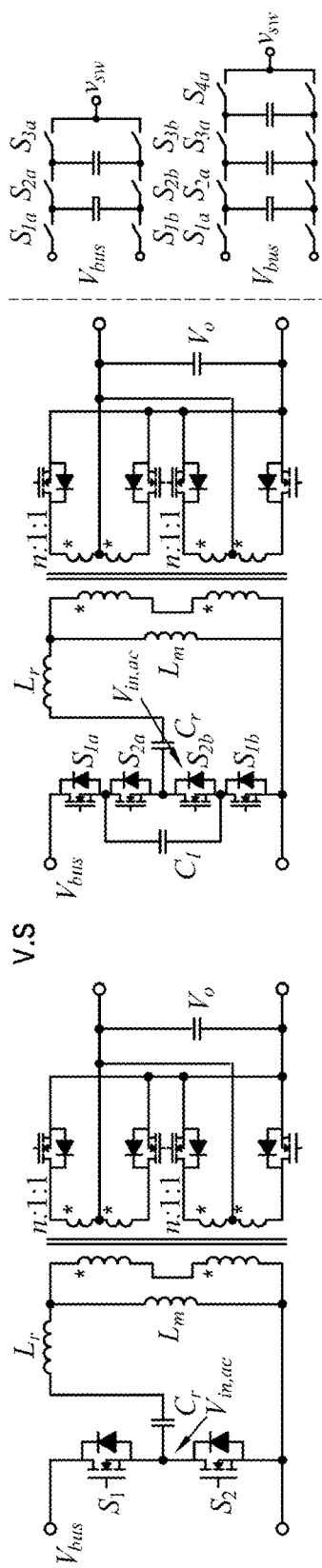
FIG. 2A
FIG. 2B
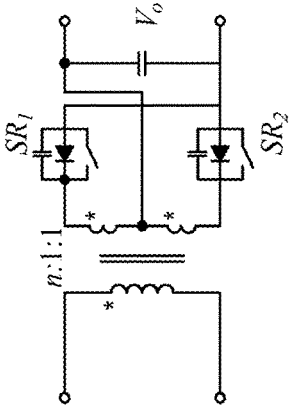
Resonant Tank
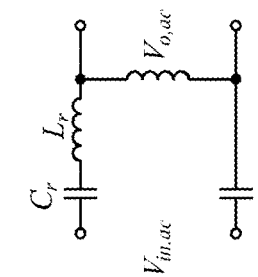
Transformer & Rectifiers
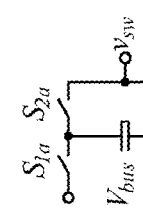
FIG. 2C
2-switch set (2-S)
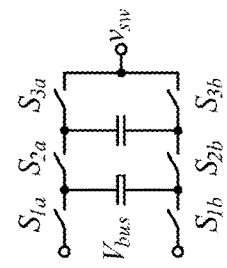
FIG. 2D
3-switch set (3-S)
FIG. 2E
4-switch set (4-S)

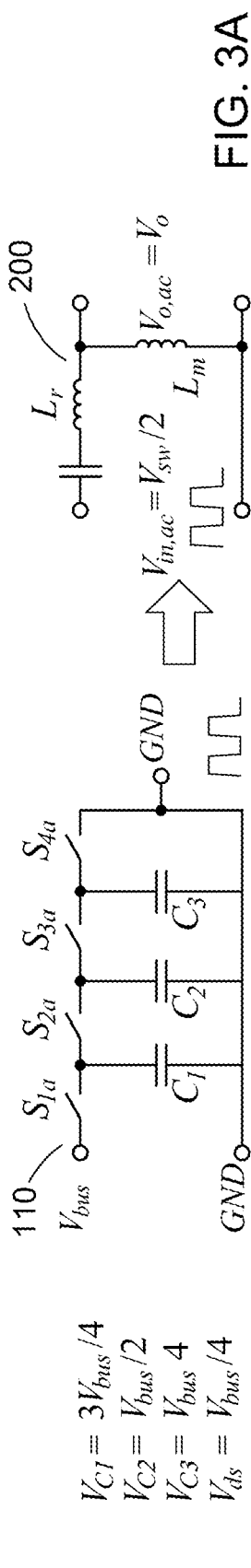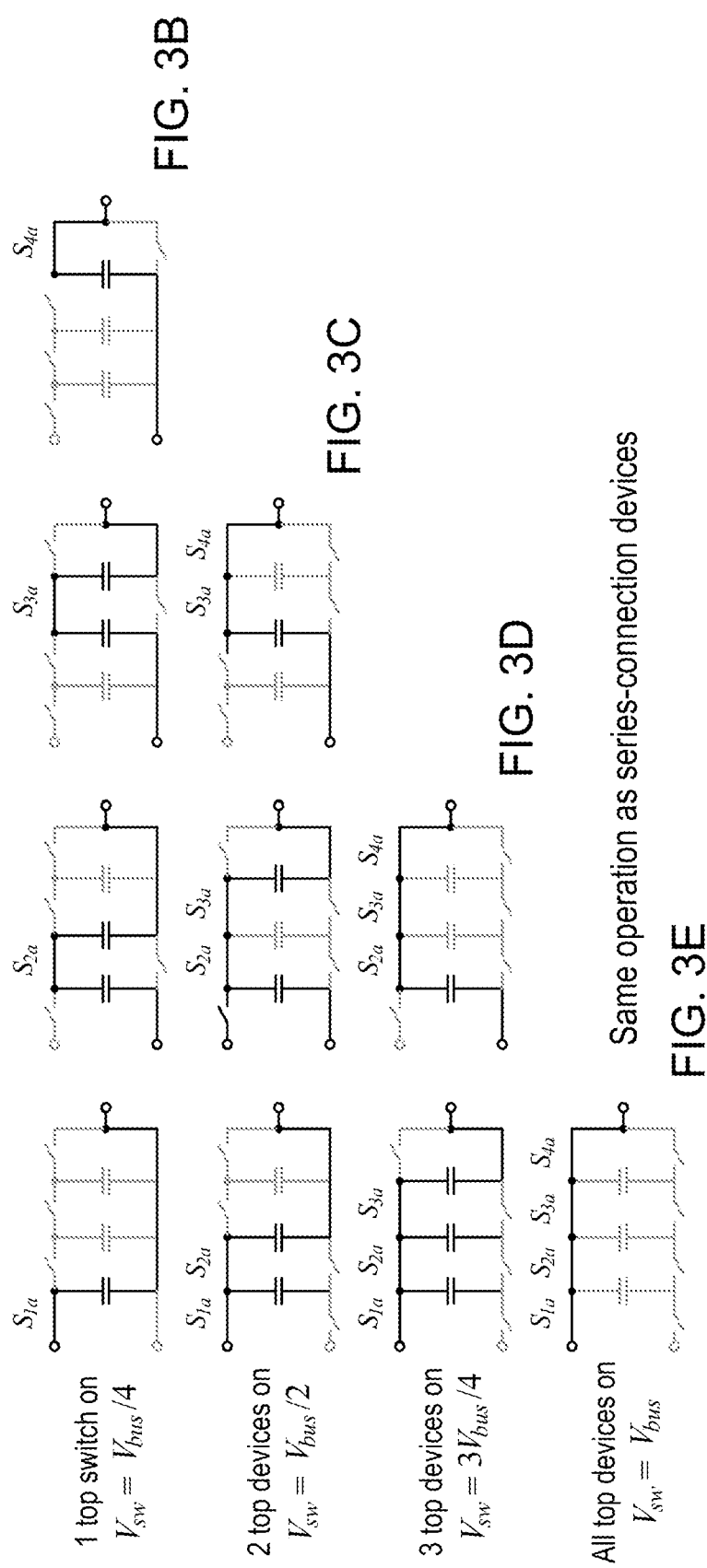
FIG. 3A
FIG. 3B
FIG. 3C
FIG. 3D
FIG. 3E

SWITCHING BRIDGE FOR WIDE GAIN CONVERTER

CROSS REFERENCE TO RELATED APPLICATIONS

This application claims priority to and the benefit of European Patent Application No. 21275145.7, filed Oct. 5, 2021, the entire content of which is herein incorporated by reference.

TECHNICAL FIELD

The present disclosure is concerned with a switching bridge of a resonant power converter for wide voltage ranges such as, but not exclusively, for a device charger such as a USB-C charger.

BACKGROUND

Power converters are used in many applications to provide an appropriate level of power to drive one or more loads from a power source. The source may be an AC or DC supply and the power can be inverted, converted, stepped up or stepped down, as required to drive the loads in question. Typically, a power converter for loads such as electronic devices, electrical vehicles and other loads will include an AC/DC stage to convert a universal voltage e.g. a grid voltage of an AC supply to a DV voltage and a DC/DC stage derives appropriate DC drive voltage output levels for the loads to be driven. Often, the DC/DC stage will need to provide a wide range of output voltages for different loads. For example, in the case of a charging device for charging mobile phones, tablets, notebook computers etc., the DC/DC stage of the charger may need to provide outputs of different levels depending on the device to be charged.

Charging devices compatible with the USB Power Delivery Standard (USB-PD) convert a universal AC voltage such as a mains voltage of 120V or 220V to a DC voltage and to then provide outputs of, say, 5V to 20V for various chargeable or mobile devices. More recently, the USB-C standard has been introduced which will require chargers to be able to handle a wide range of output voltages. Chargers that can provide a wide range of outputs are also required in other fields such as for electric vehicles.

Many types of power converter are known, but for applications such as in USB device charging, there is a need for a power converter that can be configured as a small package and that can charge quickly with low heat generation and low loss.

An LLC resonant converter has been found to be a good choice for the DC/DC stage of a USB charger power converter as it uses components that can have a small size and weight and can provide a wide range of output voltages.

The quality factor Q of the LLC resonator circuit, however, is relatively low because of the high step-down ratio and low power and this gives rise to relatively high conduction losses and poor regulation if the converter voltage gain is less than 1. The wide voltage range can require a wide switching frequency range of the switches in the switching bridge of the converter which makes the circuit difficult to control accurately and also makes it difficult to design the EMI filter to reduce harmonic distortions. The high step-down ratio also gives rise to ripple in the circuit. For known USB chargers, the USB power density defines a power rating and that defines the possible voltage profiles or outputs.

Known power converters that have a high efficiency have poor power density and, vice versa, converters with high power density have poor efficiency. There is a need for a power converter design that provides a high quality factor Q and reduced conduction losses, maximises power density and efficiency at several nominal power outputs, whilst maintaining the wide voltage range, high step-down ratio and low power of the LLC converter and without the need to make substantial changes to the current charging device structure.

SUMMARY

According to this disclosure, there is provided a switching bridge for the DC-DC stage of a power converter, the switching bridge having one or more sets of upper and lower series connected switches connected across a DC bus and arranged to be switched to provide an output AC voltage, the switching bridge further comprising a voltage divider arranged to vary the output AC voltage level according to the switching state of the switches.

Also provided is a power converter circuit including such a switching bridge, and a USB charger.

BRIEF DESCRIPTION

Examples of the power conversion circuitry of this disclosure will now be described purely by way of example. The examples are described in the context of a charger for portable or mobile devices e.g. a USB-C charger, but it should be understood that the principles of the disclosure may also apply to other fields and uses where a relatively high step-down ratio and wide voltage range is desired.

The description of the examples is with reference to the drawings, wherein:

FIG. 2A is another view of a conventional half-bridge converter

FIG. 2B shows the modification to the switching bridge according to this disclosure.

FIG. 2C shows a simple circuit diagram of the switching bridge according to one example.

FIG. 2D shows a simple circuit diagram of the switching bridge according to another example.

FIG. 2E shows a simple circuit diagram of the switching bridge according to another example.

FIGS. 3A to 3E show the voltage divider operation in more detail.

DETAILED DESCRIPTION

Figure 1:
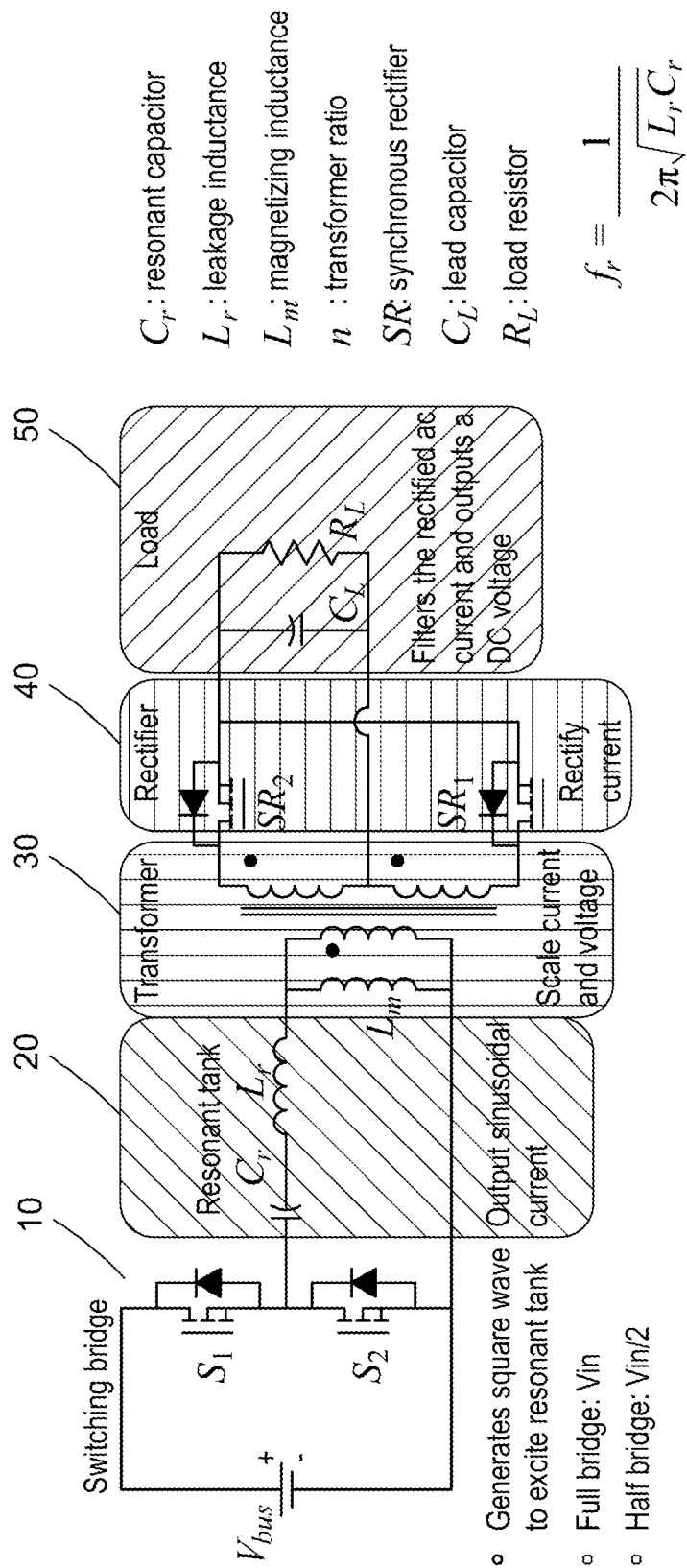
FIG. 1 is a simple schematic circuit diagram of a conventional half-bridge LLC converter.

A conventional LLC resonant converter for the DC/DC stage of a power converter is shown in FIG. 1 and includes a switching bridge 10, a resonant tank 20, a transformer 30, a rectifier 40 and a DC load output stage 50. The switching bridge comprises a number of series-connected semiconductor, e.g. MOSFET, switches S1, S2 connected across a DC Voltage bus $V_{bus}$. In use, the voltage bus will be connected to an AC power supply (not shown), with the AC supply power e.g. from a mains or grid supply, converted to the DC voltage $V_{bus}$. Typical values of $V_{bus}$ include 200V but other voltages may also be used. In the example shown, the switching bridge is a half bridge rectifier, but other forms of bridge with more switching stages, e.g. a full-bridge rectifier, may also be used. The switching bridge, by switching the switches S1, S2 at a selected frequency by operation of a gate driver (not shown) will generate a square wave to excite the resonant tank 20.

In this example, the resonant tank is represented as a series connected resonant capacitor Cr and leakage inductance Lr. The resonant frequency of the tank is $f_r$, where:

$$f_r = \frac{1}{2\pi\sqrt{LrCr}}$$

The resonant tank 20 outputs a sinusoidal current from the input square wave.

The transformer 30 receives the sinusoidal current from the resonant tank 20 and scales the current and voltage according to the ratio n of turns of the transformer coils. The stepped-down current is then rectified by the synchronous rectifier 40 which also includes semiconductor switches $SR_1$, $SR_2$. The DC output stage 50, represented here as a load capacitor $C_L$ and load resistor $R_L$, filters the rectified ac current to provide a DC output voltage.

The overall gain of the converter is equal to the product of the switching bridge gain, the resonant tank gain and the transformer ratio n.

In one example, by way of illustration only, a charger may be required to provide four nominal outputs e.g. 5V/3 A, 9V/3 A, 15V/3 A and 20V/5 A from an input voltage $V_{bus}$ of 200V. This requires a step-down or gain of between 10 and 40.

For a conventional LLC resonant converter as described above, the quality factor Q is dependent on the resonant frequency and inductance and the output power $P_o$ as well as the transformer ration and output voltage $V_o$ according to the equation:

$$Q = \frac{\pi^3 f_r L_r P_o}{4n^2 v_o^2}$$

And so for the example give, the quality factor would be around 0.019 to 0.047.

For a charger with good efficiency and power density, a power quality Q in the range of, say 0.8 to 1.2 is desirable.

Furthermore, the high circulating energy leads to a high RMS current and thus increased conduction loss and ripple. It is estimated that losses can be in the region of 10%.

The solution provided by the present disclosure, to improve the properties of the converter for a wide range of output voltages and for a high step-down ratio is to integrate a voltage divider into the switching bridge part of the circuit whilst retaining the design of the resonant tank, transformer, rectifier and output stage.

The voltage divider is formed by connecting a flying capacitor C1 across the switches of the switching bridge as will be described further below.

The concept of the integrated voltage divider can be used with switching bridges having any number of switches. The use of the flying capacitor in the switching bridge increases the number of possible voltage levels. Some example topologies will be described below.

FIG. 2A shows a conventional half-bridge LLC converter as described above. The input from the switching bridge 10 to the resonant tank 20 is, as described above, a square wave AC voltage $V_{in,\ ac}$ obtained by alternately switching the bridge switches S1, S2 on and off according to a duty cycle. The voltage from the switches to the resonant tank can only have one level, namely $V_{bus}$.

FIG. 2B shows the integrated voltage divider solution of this disclosure, in contrast. The flying capacitor C1 is connected to divide the switch voltages, effectively creating four switches $S_{1a}$, $S_{2a}$, $S_{1b}$, $S_{2b}$. The flying capacitor C1 charges during switching of the switches such that two different voltage levels can be provided at the output of the switching bridge, namely $V_{bus}$ and $V_{bus}/2$. Thus, referring back to the equations above, the minimum number of transformer turns n can be halved and may reduce the maximum switching frequency in modes less than full-bus mode. The equivalent circuit is shown in FIG. 2C.

For a switching bridge with a three switch set, the solution provides a circuit as shown in FIG. 2D which, with two capacitors, effectively creates six switches $S_{1a}$, $S_{2a}$, $S_{3a}$, $S_{1b}$, $S_{2b}$, $S_{3b}$ and providing three different voltage levels, namely $V_{bus}$, $V_{bus}/3$ and $2V_{bus}/3$. The minimum number of transformer turns is reduced to n/3 and the frequency to $f_r/3$.

By the same token, for a switching bridge with a four switch set, the solution provides a circuit as shown in FIG. 2E which, with three capacitors, effectively creates eight switches $S_{1a}$, $S_{2a}$, $S_{3a}$, $S_{4a}$, $S_{1b}$, $S_{2b}$, $S_{3b}$, $S_{4b}$ and providing three different voltage levels, namely $V_{bus}$, $V_{bus}/3$ and $2V_{bus}/3$. The minimum number of transformer turns is reduced to n/4 and switching losses may be reduced.

This last example is now taken for purposes of further explanation, but the concepts described apply to all possible switching bridge structures.

The voltage divider for the four switch example can be better understood with reference to FIGS. 3A to 3E.

FIG. 3A shows the modified switching bridge 100 with four switch sets $S_{1a}$, $S_{2a}$, $S_{3a}$, $S_{4a}$ (the top switch of each set is shown) and flying capacitors C1, C2, C3 connected from the switches to ground. The output of the switching bridge is, as before, a square wave $V_{in,\ ac}$ that is provided to the resonant tank 200. The voltage across C3 is a quarter of the input voltage $V_{bus}$—i.e. $V_{C1}=V_{bus}/4$. The voltage across C2 is a half of the input voltage $V_{bus}$—i.e. $V_{C2}=V_{bus}/2$. The voltage across C1 is three quarters of the input voltage $V_{bus}$—i.e. $V_{C3}=3V_{bus}/4$. The drive voltage $V_{ds}$ for each switch is $V_{bus}/4$.

If any one of the top switches is on, or closed, and the others are open, as shown in FIG. 3B, the switch output voltage $V_{sw}$ is $V_{bus}/4$.

If two top switches are on, as shown in FIG. 3C, the switch output voltage $V_{sw}$ is $V_{bus}/2$.

If three top switches are on as shown in FIG. 3D, the switch output voltage $V_{sw}$ is $3V_{bus}/4$.

If all top switches are on, as shown in FIG. 3E, the switch output voltage $V_{sw}$ is equal to $V_{bus}$ i.e. as in the conventional bridge.

Because the modified switching bridge is able to provide different voltage levels to the rectifier and the transformer, the transformer can have correspondingly fewer turns and the switching frequency can be correspondingly reduced for those modes less than full-bus mode. The arrangement results in an increase in the quality factor Q, reduced ripple and reduced conduction losses.

Simulation analysis has shown that the four switch set embodiment provides a smaller switch voltage but higher switch frequency, and the three switch set embodiment has higher switch voltage but lower switch frequency. Active component loss performance was found to be similar for all variations. More switches will add to the weight and size of the converter. The choice of the number of switch sets will depend on the converter specifications.

The modified switching bridge according to this disclosure has been found to reduce converter voltage gain, maximise At-Resonance-Point (ARP) operation, which is the optimal point of the LLC, especially for multiple nominal operations converters; increase the quality factor Q which leads to a reduction in circulating energy, reduce the magnetizing inductance (Lm) current ripple and to reduce device voltage stress and switching frequency.

The invention claimed is:

1. A switching bridge for a DC-DC stage of a power converter, the switching bridge comprising:
one or more sets of switches connected across a DC bus and arranged to be switched to provide an output AC voltage, wherein each set of switches comprises an upper switch and a lower switch connected in series across the DC bus; and
a flying capacitor for each set of switches, each flying capacitor connected across the upper switch and the lower switch of the respective set of switches and configured to act as a voltage divider to (i) effectively create two upper switches and two lower switches for each set of switches and (ii) vary the output AC voltage between two levels for each set of switches according to a switching state of the switches in the respective set of switches.

2. The switching bridge as claimed in claim 1, wherein the one or more sets of switches comprise a first set of upper and lower switches associated with a corresponding first flying capacitor.

3. The switching bridge as claimed in claim 2, wherein the one or more sets of switches further comprise a second set of upper and lower switches associated with a corresponding second flying capacitor.

4. The switching bridge as claimed in claim 3, wherein the one or more sets of switches further comprise a third set of upper and lower switches associated with a corresponding third flying capacitor.

5. The switching bridge as claimed in claim 4, wherein the one or more sets of switches further comprise a fourth set of upper and lower switches associated with a corresponding fourth flying capacitor.

6. The switching bridge as claimed in claim 1, wherein the switching bridge is configured to change between different switching modes based on switching different combinations of switches ON and OFF to provide a corresponding output AC voltage level.

7. A power converter comprising:
a switching bridge configured to receive a DC voltage based on a power source and generate an output AC voltage;
a resonant tank configured to convert the output AC voltage of the switching bridge to a sinusoidal signal;
a transformer configured to receive the sinusoidal signal and provide a stepped-down output;
a rectifier configured to rectify the stepped-down output of the transformer and generate a rectified signal; and
an output stage configured to filter the rectified signal to a DC load voltage;
wherein the switching bridge comprises:
one or more sets of switches connected across a DC bus and arranged to be switched to provide the output AC voltage, wherein each set of switches comprises an upper switch and a lower switch connected in series across the DC bus; and
a flying capacitor for each set of switches, each flying capacitor connected across the upper switch and the lower switch of the respective set of switches and configured to act as a voltage divider to (i) effectively create two upper switches and two lower switches for each set of switches and (ii) vary the output AC voltage between two levels for each set of switches according to a switching state of the switches in the respective set of switches.

8. The power converter as claimed in claim 7, wherein the resonant tank has a resonant tank capacitance Cr, a resonant tank inductance Lr, and a resonant frequency $$f_r = \frac{1}{2\pi\sqrt{LrCr}}.$$

9. The power converter as claimed in claim 7, wherein the rectifier is a synchronous rectifier comprising a plurality of semiconductor switches.

10. The power converter as claimed in claim 7, wherein the output stage is a DC output stage with a load capacitance $C_L$ and a load resistance $R_L$.

11. The power converter as claimed in claim 7, wherein the one or more sets of switches comprise a first set of upper and lower switches associated with a corresponding first flying capacitor.

12. The power converter as claimed in claim 11, wherein the one or more sets of switches further comprise a second set of upper and lower switches associated with a corresponding second flying capacitor.

13. The power converter as claimed in claim 12, wherein the one or more sets of switches further comprise a third set of upper and lower switches associated with a corresponding third flying capacitor.

14. The power converter as claimed in claim 13, wherein the one or more sets of switches further comprise a fourth set of upper and lower switches associated with a corresponding fourth flying capacitor.

15. The power converter as claimed in claim 7, wherein the switching bridge is configured to change between different switching modes based on switching different combinations of switches ON and OFF to provide a corresponding output AC voltage level.

16. A system comprising:
a device charger configured to charge an electronic device, the device charger comprising a power converter;
wherein the power converter comprises:
a switching bridge configured to receive a DC voltage based on a power source and generate an output AC voltage;
a resonant tank configured to convert the output AC voltage of the switching bridge to a sinusoidal signal;
a transformer configured to receive the sinusoidal signal and provide a stepped-down output;
a rectifier configured to rectify the stepped-down output of the transformer and generate a rectified signal; and
an output stage configured to filter the rectified signal to a DC load voltage;
wherein the switching bridge comprises:
one or more sets of switches connected across a DC bus and arranged to be switched to provide the output AC voltage, wherein each set of switches comprises an upper switch and a lower switch connected in series across the DC bus; and a flying capacitor for each set of switches, each flying capacitor connected across the upper switch and the lower switch of the respective set of switches and configured to act as a voltage divider to (i) effectively create two upper switches and two lower switches for each set of switches and (ii) vary the output AC voltage between two levels for each set of switches according to a switching state of the switches in the respective set of switches.

17. The system as claimed in claim 16, wherein the device charger comprises a USB charger.

18. The system as claimed in claim 17, wherein the device charger comprises a USB-C charger.

19. The system as claimed in claim 16, wherein the one or more sets of switches comprise:
   a first set of upper and lower switches associated with a corresponding first flying capacitor;
   a second set of upper and lower switches associated with a corresponding second flying capacitor;
   a third set of upper and lower switches associated with a corresponding third flying capacitor; and
   a fourth set of upper and lower switches associated with a corresponding fourth flying capacitor.

20. The system as claimed in claim 16, wherein the switching bridge is configured to change between different switching modes based on switching different combinations of switches ON and OFF to provide a corresponding output AC voltage level.

\* \* \* \* \*